United States Patent [19]

Weiss et al.

[11] 3,780,852

[45] Dec. 25, 1973

[54] ARTICLE STORAGE AND RETRIEVAL APPARATUS

[75] Inventors: Morton A. Weiss, Springfield; Bernard S. Speckhart, Short Hills, both of N.J.

[73] Assignee: White Machine Co., Kenilworth, N.J.

[22] Filed: Feb. 2, 1972

[21] Appl. No.: 222,832

[52] U.S. Cl............... 198/181, 214/16 B, 248/224, 186/1 R
[51] Int. Cl............................................ B41j 29/16
[58] Field of Search............... 214/16 B; 211/1.5, 211/121, 48, 88, 90, 150; 248/224; 312/50, 91, 268; 198/29, 181; 186/1

[56] References Cited
UNITED STATES PATENTS

| 1,718,512 | 6/1929 | Wright et al. | 186/1 R |
| 2,961,724 | 11/1960 | Alling | 248/224 |
| 3,669,035 | 6/1972 | Grossman | 248/224 |

FOREIGN PATENTS OR APPLICATIONS

| 1,427,294 | 12/1965 | France | 211/1.5 |
| 1,165,546 | 3/1964 | Germany | 211/88 |
| 449,198 | 4/1968 | Switzerland | 211/121 |

Primary Examiner—Gerald M. Forlenza
Assistant Examiner—R. B. Johnson
Attorney—Thomas Cifelli, Jr. et al.

[57] ABSTRACT

Apparatus for the storage and retrieval of inventories of articles of manufacture. The apparatus includes a vertical frame having a continuous oval track located at the base of the apparatus. A continuous conveyor is supported on the frame and guided on the oval trackway. The conveyor includes a plurality of side by side articulated, rigid support members of racks guided in a vertical attitude on the vertical frame. A plurality of vertically spaced storage bins are detachably secured on the support members or racks.

5 Claims, 6 Drawing Figures

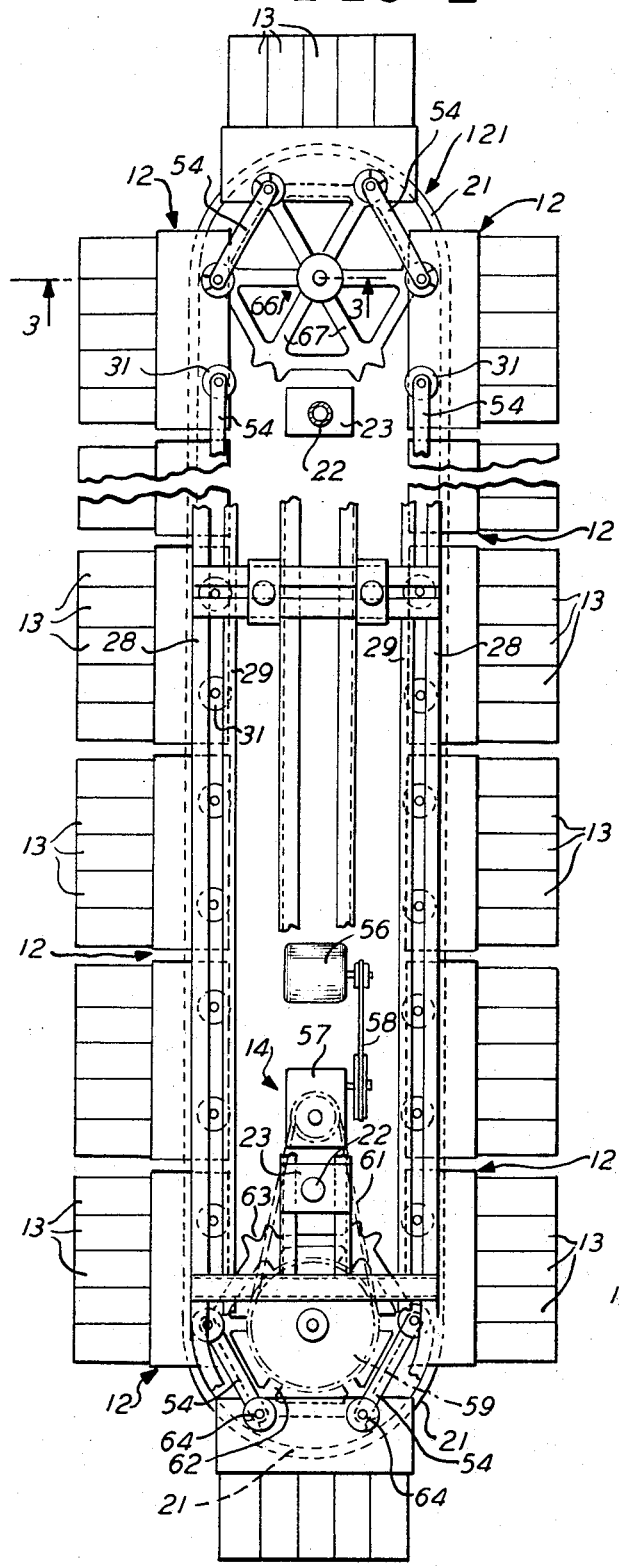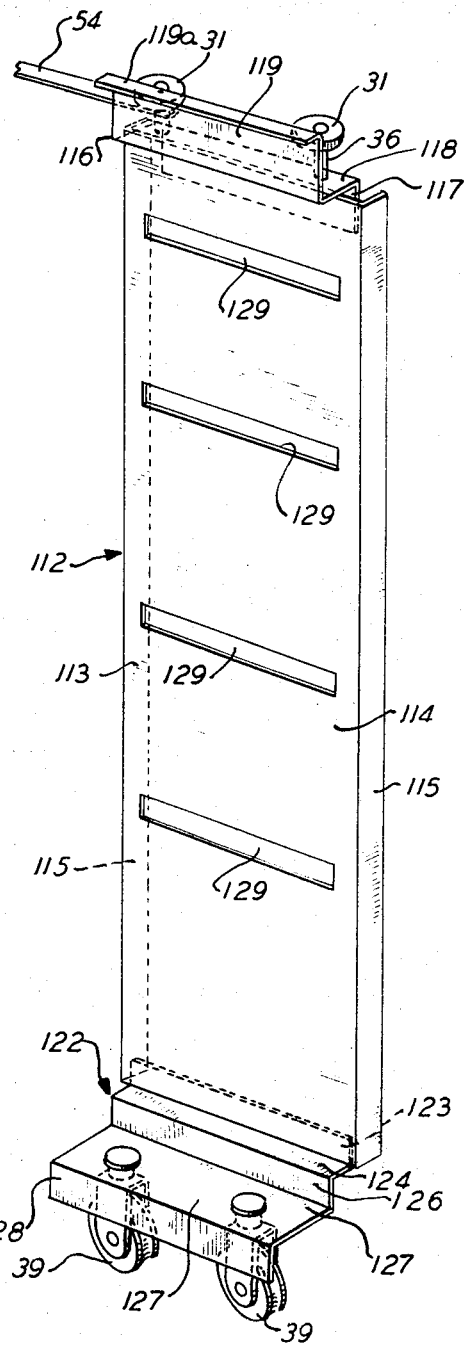

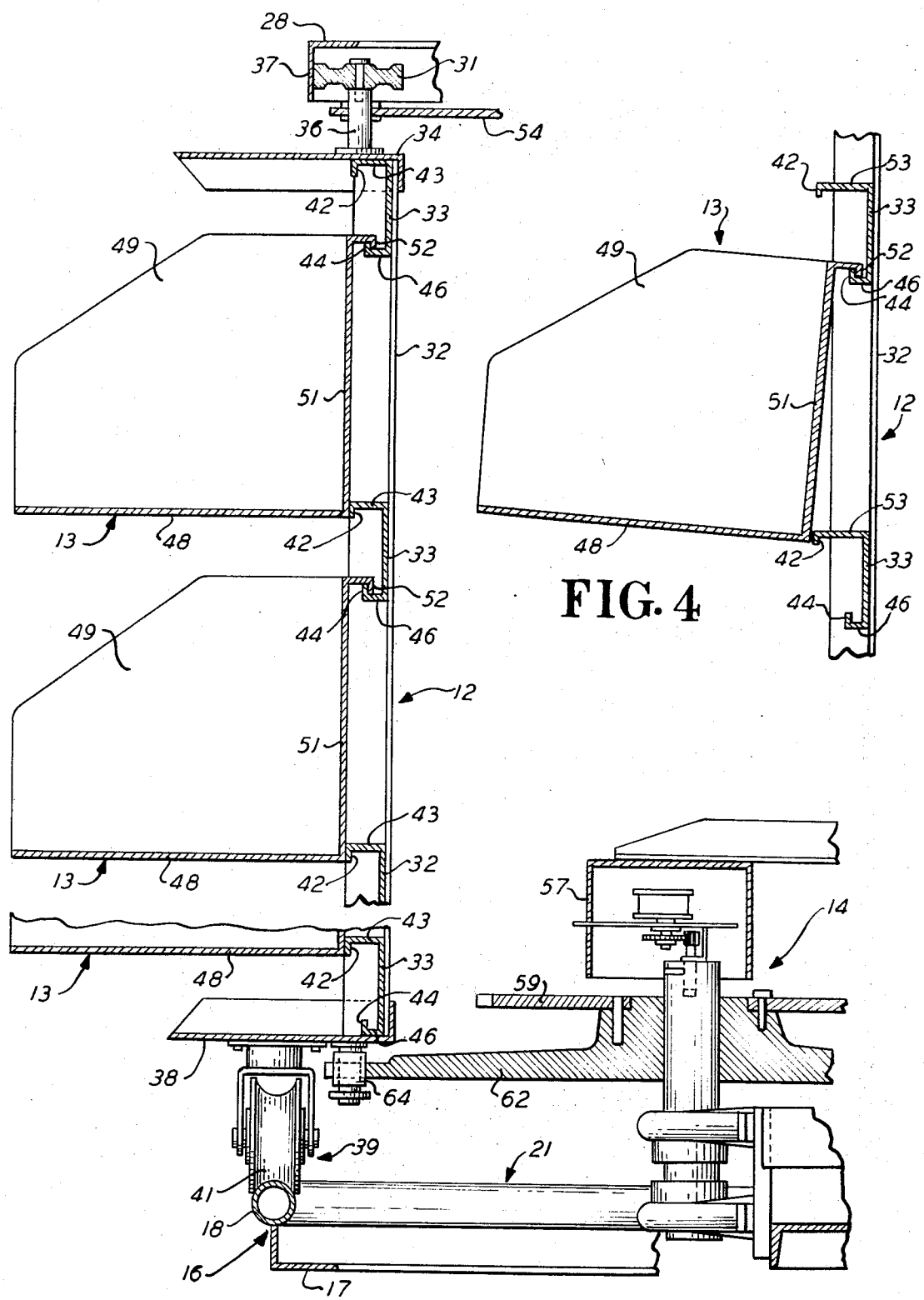

ARTICLE STORAGE AND RETRIEVAL APPARATUS

BACKGROUND OF THE INVENTION

The present invention relates to improved apparatus for the storage and retrieval of articles of manufacture of the type normally stored in bins, and more particularly to a continuous conveyor for such bins.

Manufacturing plants and retail establishments which assemble or service articles of manufacture generally have a storage location remote or distant from the retrieval location at which the article is to be worked upon or otherwise dispensed. This requires that someone other than the person at the delivery station be delegated to act as a runner between the storage and retrieval stations. As is well known this results not only in a labor inefficiency but also in the possibility of human error by the delivery of the improper article.

The storage and retrieval device of the present invention is intended to overcome these difficulties and inefficiencies. Moreover the structure is constructed so as to be capable of use in widely varied fields, as for example in the industrial field to carry inventories for a production assembly line or in the sales field to deliver products to a sales station. A further field of use is the hospital field for use in storing drugs, surgical packs, sterile instruments and other such associated medical supplies which are generally dispensed from a single service station.

From the above general description, it should be apparent that the present invention is adapted for use with items which may be quite heavy so as to impose considerable stress on the conveyor structure.

It is an object of the present invention therefor to provide a conveyor structure which is capable of withstanding the stresses imposed thereon by the weight of the articles being conveyed and dispensed.

It is another object to provide a conveyor having a plurality of storage bins which are capable of being detached and filled at an inventory station remote from the conveyor apparatus so that it is not necessary to stop the operation of the apparatus to fill one or more of the storage bins.

It is a further object to provide means for carrying a plurality of detachable storage bins in rows on the apparatus.

SUMMARY OF THE INVENTION

The above and other objects are achieved by the apparatus of the present invention comprising generally a vertical frame having an endless track along the base, a plurality of side-by-side and articulated, rigid racks or storage members supported on the track and guided by the frame. Vertically spaced storage bins for storing and supporting the items to be conveyed are detachably mounted on the racks or storage members.

BRIEF DESCRIPTION OF THE DRAWINGS

These and other objects of the invention which will be apparent from the detailed description below are achieved by providing a novel combination conveyor and article storage means, an illustrative embodiment of which is shown in the accompanying drawing wherein:

FIG. 2 is a top plan view of the apparatus of FIG. 1;

FIG. 3 is an enlarged fragmentary cross-sectional view taken generally along the lines 3—3 of FIG. 2;

FIG. 4 is an enlarged fragmentary cross-sectional view similar to FIG. 3, but showing a slightly modified bin support arrangement on the storage support members.

FIG. 6 is a perspective view of a modified rack which may be used in the apparatus of the present invention.

DETAILED DESCRIPTION OF THE INVENTION

Figure 1:
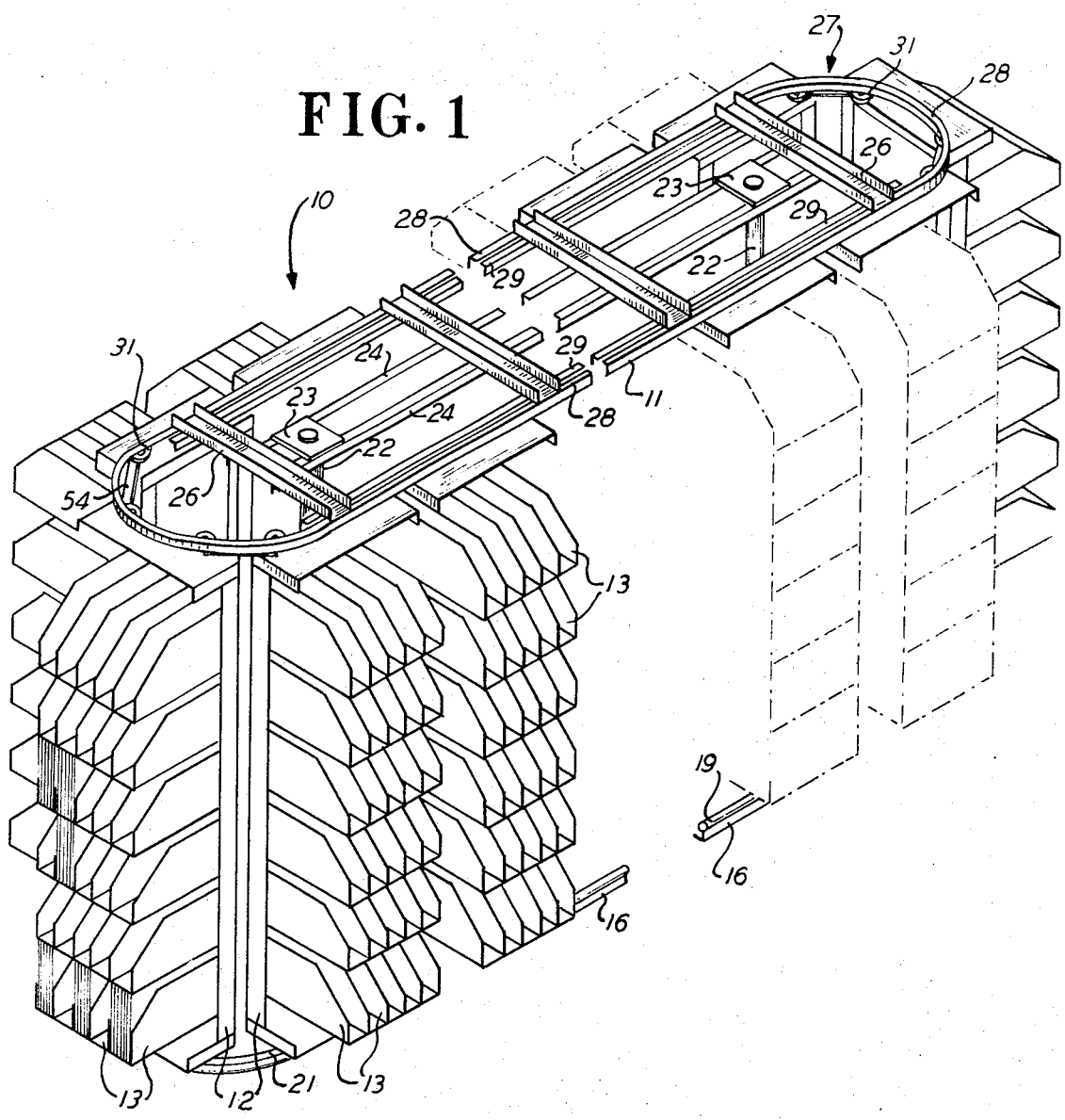
FIG. 1 is a perspective view of a storage and retrieval conveyor embodying the principles of the invention.

Referring now to the drawings there is shown a conveyor apparatus 10 embodying the structure of the present invention. The apparatus 10 comprises generally a frame 11 having a plurality of rigid racks 12 movably supported and guided thereon. The racks 12 each have a plurality of storage bins 13 detachably supported thereon. Suitable drive means 14 move the racks 12 about the frame 11.

The frame 11, as shown in FIGS. 1, 2 and 3, includes a base 16 comprising angle irons 17 which are suitably fixed to the floor of the site at which the apparatus 10 is installed. A track 18 made from tubular stock of substantially circular cross section is attached as by means of welding to the angle iron 17. The angle iron 17 and track 18 are formed to provide a continuous path somewhat oval shaped with two lengthwise extending and parallel straight track sections 19 and semi-circular end sections 21.

Lengthwise spaced vertical posts 22 are attached to the base 16 and have attachment plates 23 fixed to the upper ends. A pair of parallel support channels 24 are fixed to the plates 23 and support transversely extending channel braces 26 at the opposite ends thereof. The channel braces 26 support a guide rail assembly 27 including an outer guide rail 28 and an inner rail 29. The outer rail 28 is made from angle iron and is substantially oval shaped to provide a continuous guide path and the inner guide rail 29 extends parallel to the straight run of the outer rail 28. The inner and outer rail form a confining structure for guide wheels 31 of the racks 12.

Figure 5:
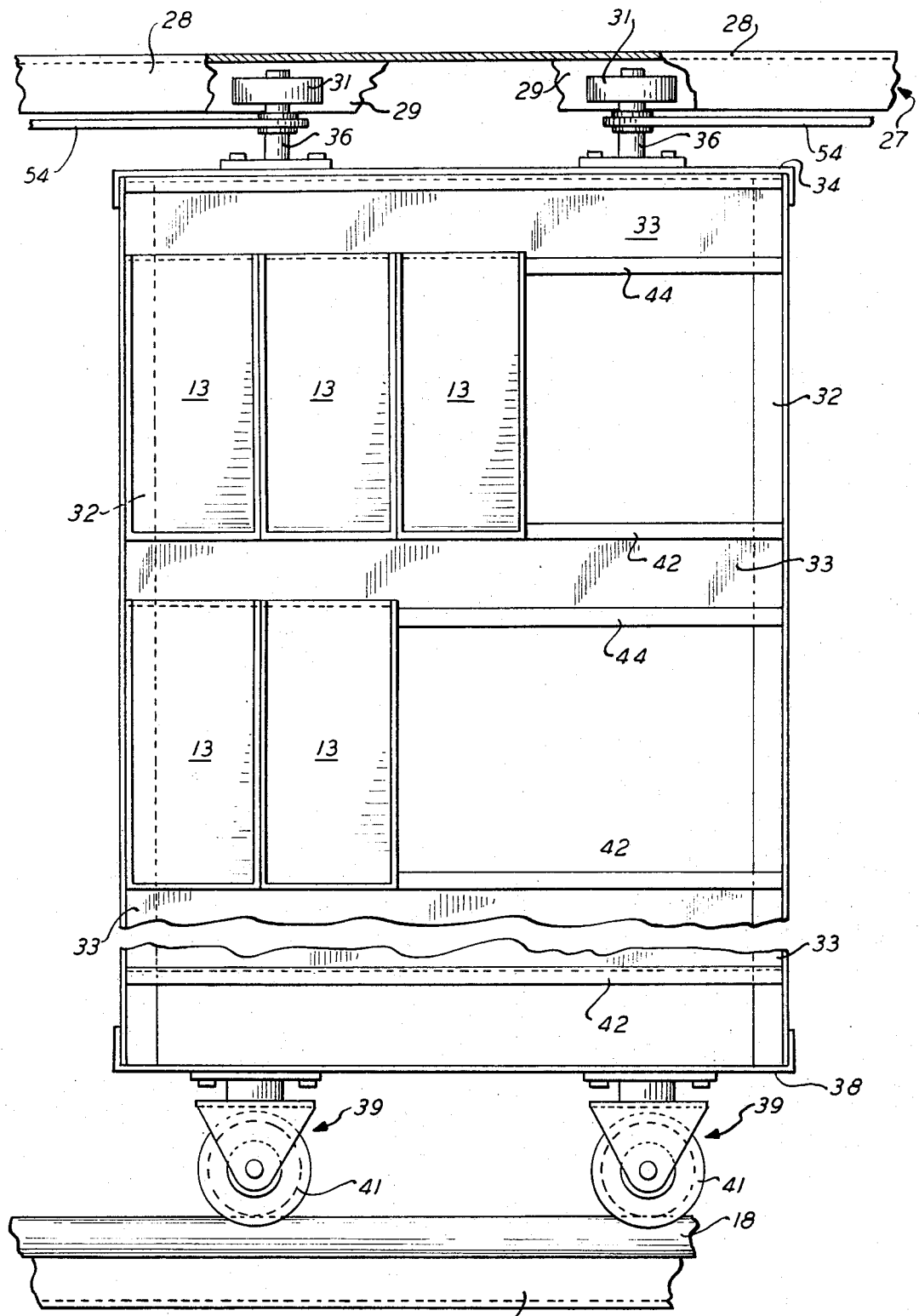
FIG. 5 is an enlarged fragmentary side elevational view of the conveyor showing one of the storage racks with some of the storage bins removed.

The racks 12, as shown in particular in FIGS. 3 and 5, each may be of more or less open frame rectangular construction including a pair of upright side angle members 32—32. Spanning the side members 32—32 are vertically spaced channel-like bin attachment members 33. A guide wheel support member 34 is fixed to the upper one of the bin attachment members 33. A pair of guide wheel shafts 36 project upwardly from the support member 34 and journal the guide wheels 31 which are loosely contained between the downwardly depending guide flanges 37 of the inner and outer guide rails 27 and 28.

A rack wheel support member 38 is fixed to the lowermost of the bin attachment members 33. Rack wheel assemblies 39 are mounted on the member 38. The rack wheel assemblies 39 each includes a grooved wheel 41 which rides on the circular cross section rail 18.

As shown particularly in FIG. 3, the bin attachment members 33 are of general channel cross-section and include an upper vertical stop lip 42 depending from an upper horizontal flange 43. An attachment lip 44 projects from a lower horizontal flange 46.

The bins 13 are detachably mounted on the bin support members 33 at the attachment lip 44. The bins 13 include a base 48, walls 49 and a rear wall 51. A hook means 52 extends from the rear wall 51 and is engageable with the lip 44. When thus engaged the lower end of the bin 13 abuts the stop lip 42 whereby the bin base 48 is maintained in a substantially horizontal plane. Under some circumstances, it may be desired to maintain the bin 13 in an inclined or tilted position as shown in FIG. 4. To this end an upper flange 53 of greater length than the flange 43 is formed on the bin attachment member 33 so that the stop lip 42 projects outwardly a greater distance. This causes the lower end of the bin rear wall 51 to be inclined outwardly a greater distance from the vertical plane of the rack so that base 48 is inclined upwardly, as shown.

The racks 12 are articulated to each other by straps or links 54 pivotally connected at opposite ends to the guide wheel shafts 36. In this manner the racks 12 are articulated so that a single drive means 14 may be used to move the racks 12 simultaneously about the frame 11.

The drive means 14, as shown in particular in FIGS. 2 and 3, comprises a motor 56 which drives a gear or speed reduction unit 57 by means of a drive belt 58. The gear reduction unit drives a sprocket 59 by means of a sprocket chain 61. The sprocket 59 includes a plurality of angularly spaced arms 62 each of which includes a forked end 63. The forked ends 63 are engageable with drive pins 64 extending from the rack wheel support members 38. Thus upon rotation of the arms 62 by the motor 56 through the gear reduction unit 57 and belts 58 and sprocket chain 61, the forked ends 63 engage the drive pins 64 to drive racks 12 about the curved or semi-circular sections 21 of the track 18. This also causes the remaining racks 12 to be simultaneously moved by means of the articulating links 54 connecting adjacent racks 12 at the guide wheel shafts 36.

The racks 12 are guided for movement along the track 18 by the inner and outer guide rails 28 and 29 along the straight track sections 19. An idler sprocket 66 rotatably supported adjacent the semi-circular end 121 opposite the drive sprocket 59 has a plurality of fork ended arms 67 which engage the drive pins 64 and guide the moving racks about the circular end section of the track 18. It is to be noted that weight of the racks 12 including the bins 13 is supported on the base located tracks 18. The upper portions of the racks 12 are only guided by the guide rails 28 and 29 so that the weight of the rack 12 and the attendant load is not imposed thereon. This results in imposing the load stresses on the track 18 located at the base wherein they may be readily assumed without failure of the frame.

Starting and stopping of the motor 56 is controlled by a manual control switch (not shown) which is part of the drive control circuit. The motor 56 may be of the reversible type so that the motor may optionally drive the racks either clock or counter clockwise.

Referring now to FIG. 6, there is shown another embodiment of rack 112 which may be used with apparatus 10 of the present invention. The rack 112 includes a sheet metal panel 113 having a web 114 and side flanges 115 bent normal to the web 114. Fixed to web 114 along the top are support members 116 having a vertical flange 117, an outwardly projecting horizontal flange 118, and an upwardly extending flange 119 which terminates in an outwardly extending flange 119a. A lower support member 122 has a vertical flange 123 attached to the web 114. A horizontal web 124 projects from the flange 123 and a vertical web 126 depends from the flange 124. A horizontal web 127 projects from the flange 126 and terminates in a depending flange 128.

The guide wheel assemblies including the guide wheels 31 rotatable on shafts 36 are mounted on the web 118. The links 54 connecting the racks are pivotally connected to the adjacent shafts 36 in the same manner as described in connection with the rack embodiment of FIGS. 1–5. The rack wheel assemblies 39 are attached to the web 127 of the lower member 122.

The panel webs 114 are provided with transversely extending slots 129 that are vertically spaced from each other. The slots 129 accommodate the hooks 52 along the upper edge of the rear wall 51 of the bins 13. The rack 112 is driven on the frame of the apparatus in the same manner as heretofore described.

In the use and operation of the storage and retrieval apparatus 10 of the present invention, assuming that the apparatus is adapted for use in an automobile assembly line, the bins 13 are removed from the racks 12 and stocked with the required components to be assembled at the particular location along the production line. Assuming that the location on the production line is one at which a bracket is to be fastened by nuts, bolts, and washers, the bins on one of the racks 12 may contain the brackets, while the following rack may contain the nuts, bolts, and washers in separate bins. The bins 47 are detached from racks and filled with the respective components to be assembled at an inventory station.

When the bracket and fastening elements are called for, the motor switch is actuated and the sprocket wheel is actuated until the rack 12 and bins 13 filled with the parts are located at the retrieval station along the production line, whereupon the parts are removed from the bins and assembled. Upon further demand, the switch may again be energized until another rack or racks is located at the desired production line station. While the filled bins are located at the operating station, the empty bins may be detached from the rack at the inventory station to be refilled with parts.

The removal of the bins 13 from the racks 12 at an inventory station is advantageous because it assists in expediting the filling thereof. For example, in the foregoing illustration in which nuts and bolts are used, the bins 13 may be used as scoops to achieve a rapid filling. The bins may then be reattached to the racks and the parts stored therein until required for assembly.

Although the present invention has been described in conjunction with the specific apparatus shown in the accompanying drawings, the apparatus is merely illustrative and is not to be construed as limiting the scope of the invention as set forth in the appended claims.

We claim:

1. Apparatus for the storage and retrieval of articles comprising:
    a. a frame including:
        1. a base having an endless mono-rail track of circular cross-section, said track including a pair of substantially straight, parallel sections joined at the opposite ends by substantially semi-circular sections;

2. guide means on the upper end of said frame;
   a. said guide means comprising a pair of substantially straight parallel sections each comprised of a pair of spaced, vertical plates;
      1. said straight parallel sections of said guide means being joined at opposite ends by a substantially semi-circular section comprised of a single vertical plate;
b. a plurality of vertically disposed, substantially rectangular racks, each including a plurality of storage bins loosely and detachably fastened thereto;
   1. said racks each being slideably supported on said mono-rail track by a first pair of spaced, grooved wheel means mounted at the lower end of each of said racks and each of said racks being maintained in a substantially vertical attitude by a second pair of spaced wheel means mounted at the upper end of each of said racks;
      a. said second pair of spaced wheel means being rotatable about a vertical axis and disposed between said pair of spaced vertical plates of said guide means;
c. interconnecting means between said racks for simultaneous movement thereof along said endless mono-rail track; and
d. drive means selectively and sequentially engageable with each of said racks at the bottom thereof whereby all of said racks are driven along said endless mono-rail track.

2. The invention as defined in claim 1 wherein said storage bins are detachably fastened to said racks by a depending hook provided at the back of each of said bins and extending along the length of the top edge thereof and a complementary upstanding lip provided on each of said racks and extending across the width thereof and with which said depending hook is loosely engageable.

3. The invention as defined in claim 1 wherein said storage bins are detachably fastened to said racks by a depending hook provided at the back of each of said bins and extending along the length of the top edge thereof and a complementary elongated slot provided in each of said racks, said slot extending substantially across the width of said rack and through which said depending hook projects and seats loosely on the bottom edge defining said slot.

4. The invention as defined in claim 2 wherein said detachably fastened storage bins are maintained with the bottom panel thereof in a substantially horizontal attitude by a depending stop lip provided on each of said racks and extending across the width thereof, said stop lip being engageable with the back panel of said bins along the length of the lower edge thereof and extending horizontally outwardly from the plane of said racks a distance sufficient to maintain said back panel parallel to the vertical attitude maintained by said racks when said depending hook is loosely engaged with said complementary upstanding lip.

5. The invention as defined in claim 2 wherein said detachably fastened storage bins are maintained with the bottom panel thereof in an outwardly upwardly inclined attitude by a depending stop lip provided on each of said racks and extending across the width thereof, said stop lip being engageable with the back panel of said bins along the length of the lower edge thereof and extending horizontally outwardly from the plane of said racks a distance sufficient to maintain the lower end of said back panel inclined outwardly a greater distance than the upper end of said back panel from the vertical attitude maintained by said racks when said depending hook is loosely engaged with said complementary upstanding lip.

* * * * *